UNITED STATES PATENT OFFICE.

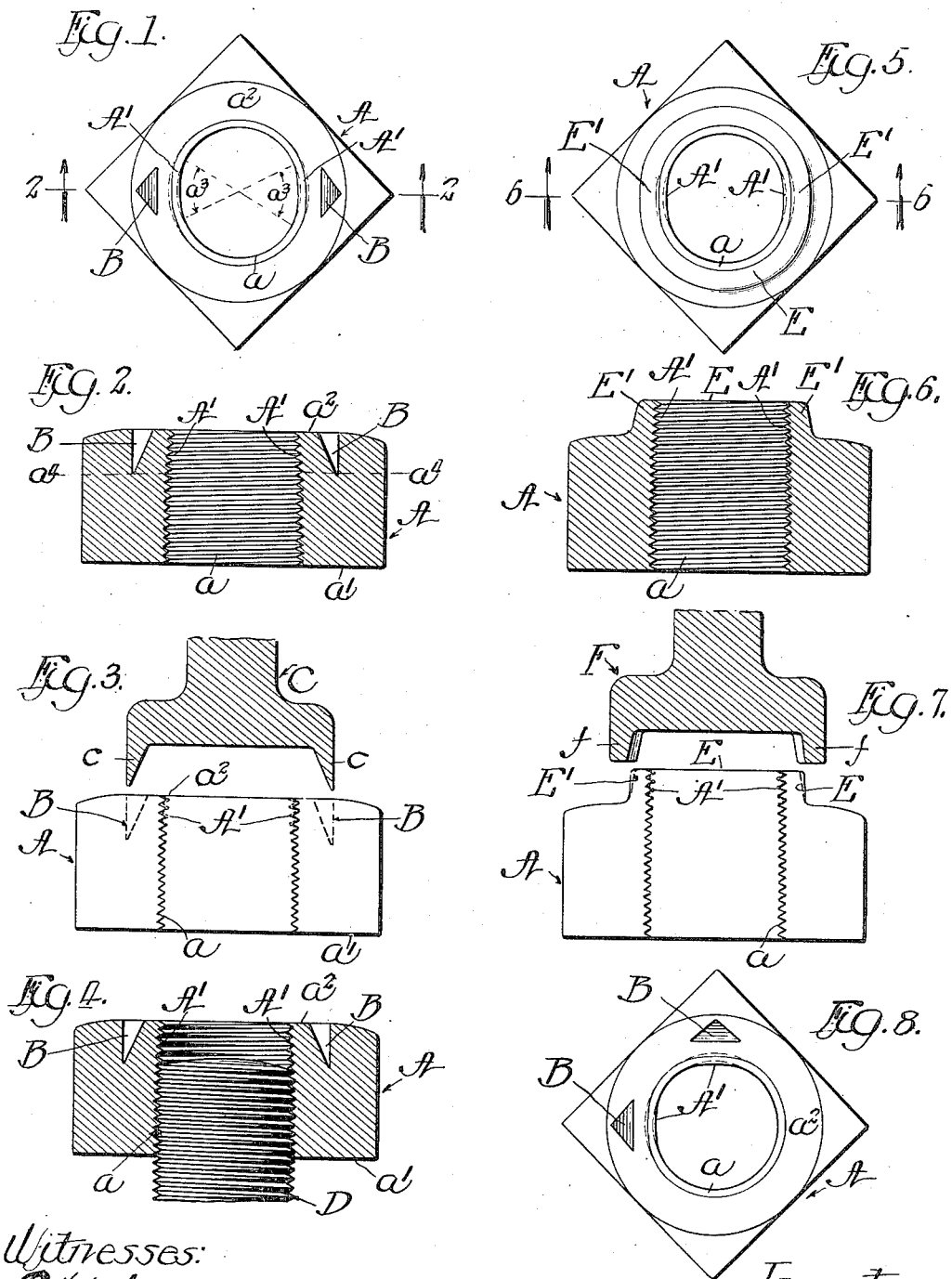

BENJAMIN S. McCLELLAN, OF CHICAGO, ILLINOIS.

LOCK-NUT.

1,083,217.  Specification of Letters Patent.  Patented Dec. 30, 1913.

Application filed April 8, 1912. Serial No. 689,107.

*To all whom it may concern:*

Be it known that I, BENJAMIN S. MC-CLELLAN, a citizen of the United States, and a resident of Chicago, in the county of Cook and State of Illinois, have invented certain new and useful Improvements in Lock-Nuts; and I do hereby declare that the following is a full, clear, and exact description thereof, reference being had to the accompanying drawings, and to the letters of reference marked thereon, which form a part of this specification.

This invention relates to an improved lock-nut, and more particularly to a nut of that kind which is itself adapted for locking engagement with the bolt to which it is applied, as distinguished from a nut locking device applied in connection with an ordinary nut to hold the same from turning upon or becoming unscrewed from the bolt.

In its general features, a lock-nut embodying my invention, has its screw-threaded aperture, in the principal part of the length of such aperture, uniform in diameter and adapted to receive the screw-threaded end of the bolt, in the usual manner, but such screw-threads, in the part of the aperture adjacent to the outer face of the nut, are displaced or bulged inwardly at one or more points in the circumference of the nut so that the radial dimension of the aperture at the place or places at which the screw-threads are so displaced inwardly, is less than the general radius of the other parts of the aperture, so that when the nut is screwed upon the bolt, the parts of the screw-thread of smaller radius will come into binding engagement with the screw-threads at the outer end of the bolt in the manner to prevent the loosening or unscrewing of the nut, unless a considerable degree of force be applied to the nut especially for the purpose of turning the same backwardly to remove it from the bolt.

The invention consists of the matters hereinafter described and pointed out in the appended claim.

In the accompanying drawings—Figure 1 is a top view of one form of nut embodying my invention; Fig. 2 is a sectional view taken on line 2—2 of Fig. 1; Fig. 3 is a sectional view of a screw-threaded nut blank before the same is finally completed, shown in outline only, in connection with a tool for completing the nut in the form shown in Figs. 1 and 2; Fig. 4 is a view of the nut shown in Figs. 1 and 2 with the bolt partially inserted therein; Fig. 5 is a plan view of another form of nut embodying my invention; Fig. 6 is a sectional view taken on line 6—6 of Fig. 5; Fig. 7 is an outline sectional view of the nut blank after it is threaded but before its completion, showing a tool for completing the nut; Fig. 8 is a plan view of a form of nut slightly different from that shown in Figs. 1 and 2.

As shown in Figs. 1 to 4, A indicates the nut, which is of usual form and provided with internal screw-threads $a$.

$a'$ indicates the inner or bearing surface of the nut, and $a^2$, the outer face thereof. The aperture or bore of the nut, in the greater part of its length and adjacent to its inner face $a'$, is made cylindric, or of uniform diameter, and its screw-threads conform to a true cylinder. In the part of the aperture adjacent to the outer face $a^2$ of the nut, the metal of the nut is displaced or bulged inwardly in a portion of the circumference of the aperture, as indicated by $A'$, $A'$. The length circumferentially of the said inwardly bulged parts $A'$, $A'$, is indicated by the arcs $a^3$, $a^3$, formed between the radial dotted lines shown in Fig. 1. The result of such inward displacement of the metal of the nut is that the aperture adjacent to its outer face, in a portion of the circumference thereof, is of a smaller radius than the main part of the aperture, and than the screw-threaded end of the bolt to which the nut is to be applied.

The metal is preferably so bulged or displaced inwardly that the sides of the aperture between the inwardly bulged parts conform to arcs of a true circle, while the lines defining the bulged parts are deflected gradually inward from said arcs, so that the extent of inward displacement of the screw-threads is greatest at the center of each bulged portion and gradually lessens toward the ends of the same. As will be seen from the sectional view, Fig. 2, moreover, the metal is displaced or bulged inwardly to the greatest extent at the outer face $a^2$ of the nut, and to a gradually lessening extent inwardly from said outer face; the inwardly bulged parts meeting or merging into the truly cylindric main part of the aperture at a short distance inwardly from said outer face. As a result of this construction, the opposite sides of the aperture are parallel with each other from the inner face $a'$ of the nut to a line located at a short distance from the outer face $a^2$ of the nut, as indicated by the dotted line $a^4$—$a^4$ in Fig. 2, and then converge inwardly until they intersect the said outer face. It will be understood, further, that the screw-threads of the nut are continued without change in their cross-sectional form and retain their normal pitch or true spiral form, in the inwardly bulged parts A′ A′ of the aperture as well as in other parts of the same. In other words, the screw-threads are uniform throughout all parts of the aperture. This result is obtained by forming the screw-threads in a nut blank having a cylindric aperture, and then displacing or forcing radially inward the metal at portions of the circumference of the aperture, so as to slightly distort or deflect the threads from their true cylindric form, without otherwise changing the shape of the threads, as hereinafter more fully described.

As shown in the figures of the drawing referred to, the inward displacement of the metal at the sides of the aperture is effected by the formation of recesses B, B, extending into the body of the nut from the outer face $a^2$ of the same and of triangular and inwardly tapered form, as shown in Fig. 2.

As a preferable way of constructing the nut, it is first provided with a screw-threaded aperture of regular cylindric form from end to end, as shown in full lines in Fig. 3, and a swaging tool C having tapered prongs $c, c$, is then used to form the recesses B, B, the effect of the action of the tapered prongs $c, c$ being to force inwardly, or effect inward displacement of, the metal adjacent to the outer end of the aperture, to shift inwardly the screw-threads in a part of the circumference of the aperture, as indicated in dotted lines in said Fig. 3.

Fig. 4 shows the nut, A, when partially screwed upon a bolt D, the end of the bolt being shown as engaged with the cylindric, screw-threaded part of the aperture of the nut. As will be seen from said Fig. 4, when the nut is screwed upon the bolt until its outer face is carried to or past the end of the bolt, the inwardly displaced parts A′ A′ of the screw-threads will be crowded laterally against and will bind upon the screw-threads of the bolt in a manner to prevent the nut from becoming unscrewed.

The nut shown in Figs. 5 to 7 is provided at its outer face with an annular projection or rib E surrounding the aperture in the nut. The said rib E is bent or forced inwardly at two points, indicated by E′, E′, so as to form inwardly displaced parts A′ A′, like those shown in Figs. 1 and 2. The inward displacement of the metal constituting the rib E, is preferably effected by means of a tool, such as indicated at F, in Fig. 7, the same having swaging prongs $f, f$, curved and tapered on their inner surfaces and adapted to act upon the outer surface of the rib E, preferably at diametrically opposite points, so as to force inwardly portions of said rib, as indicated in dotted lines in Fig. 7.

Fig. 8 shows a nut generally like that shown in Fig. 1, but having two recesses B, B, located at an angular distance of 90° apart instead of diametrically opposite to each other, as shown in Fig. 1.

From the construction described, it will be understood that a nut embodying my invention, has its screw-threads of regular and uniform construction throughout the entire length of its bolt-receiving aperture, but in the part of the aperture nearest its outer face, the metal at one or more places around the aperture is deflected inwardly from a true circle so as to make the radius of the aperture at such places smaller than the radius of the other parts of the aperture. The result of this feature of construction is that when the nut is screwed upon the bolt, and the inwardly deflected parts of the screw-threads come into engagement with the screw-threads on the bolt, as the nut is turned, the surfaces of the inwardly displaced or deflected parts of the nut and of the screw-threads of the bolt in contact therewith, must necessarily yield or be compressed to an appreciable degree in order to permit the nut to reach its proper place on the bolt. Moreover, after either of the said inwardly deflected or bulged parts, in the turning of the nut, have moved or traveled past a certain part of the circumference of the bolt, the pressure on the contacting parts being relieved, the metal will to a certain degree expand or resume its normal shape behind the bulged part of the nut, so that the nut cannot be again unscrewed without again compressing the metal of the bolt that was behind the bulged part of the nut when the latter was turned forwardly. By making portions of the circumference of the exterior screw-threads of the nut of smaller radius than the screw-threads at other parts of the nut, therefore, I provide a nut which will itself have such binding engagement with the bolt when placed upon the same so as to prevent any backward turning of the nut under usual conditions of use.

In the case of a nut having a bore of about one inch, I have found that good results are produced by making the radius of the bore at the points of maximum inward deflection or displacement .005 of an inch less than the radius of the remainder of the bore, but the degree of such inward displacement can be varied according to the size of the bolt or of the screw-threads, or other conditions.

It is to be observed that the application to a bolt of a nut, made as described, has no tendency to distort or change the form of the screw-threads of the bolt, because the screw-threads on the inwardly deflected parts A' A' of the nut act to give a direct lateral pressure on the screw-threads of the bolt, and an equal pressure on both inclined faces of each thread. Moreover, by acting with equal pressure on both inclined faces of each screw-thread, the nut is given a very strong grip upon the bolt. My improved nut, therefore, differs in effect, from the nut-locks heretofore made, consisting of a nut of thin metal, bent into curved form, then screw-threaded, and then partially flattened so as to distort the screw-threads from their true spiral form. Such nut-locks, when applied to the bolt, bind at circumferentially separated points upon the opposite inclined faces of each screw-thread, so that when applied to the bolt and removed therefrom one or more times, they are liable to change the form of, or wear out, the threads of the bolt, and have a less effective binding or holding effect, than a nut made as herein shown and described.

The form of nut embodying my invention herein illustrated, may be variously modified in practice, and I do not, therefore, desire to be limited to the specific features of construction illustrated, except so far as pointed out in the appended claim.

I claim as my invention—

A nut having a screw-threaded aperture, and the metal of which is continuous circumferentially of said aperture, the screw-threads in said aperture, in the portion thereof adjacent to the inner face of the nut, being of uniform radius and conforming to a true cylinder, and the said nut being distorted, prior to its application to the bolt, in the part thereof adjacent to its outer face, in such manner that the screw threads in the distorted part of the nut, in a portion of the circumference of said screw threads, have the same radius as the screw threads in the portion of the aperture adjacent to the inner face of the nut, and in another part of their circumference are deflected inwardly from a true circle and have a smaller radius than that of the regularly formed screw threads in said part of the aperture adjacent to the said inner face of the nut.

In testimony, that I claim the foregoing as my invention I affix my signature in the presence of two witnesses, this 4th day of April A. D. 1912.

BENJAMIN S. McCLELLAN.

Witnesses:
T. H. ALFREDS,
EUGENE C. WANN.